March 3, 1953 P. R. EASTERLIN 2,630,483

TELEGRAPH REPEATER SWITCHING SYSTEM

Filed Dec. 14, 1951 5 Sheets-Sheet 1

INVENTOR.
P. R. EASTERLIN

BY [signature]

ATTORNEY

INVENTOR.
P. R. EASTERLIN
BY
W. F. Presson
ATTORNEY

March 3, 1953 P. R. EASTERLIN 2,630,483

TELEGRAPH REPEATER SWITCHING SYSTEM

Filed Dec. 14, 1951 5 Sheets-Sheet 3

INVENTOR.
P. R. EASTERLIN

BY

ATTORNEY

March 3, 1953 P. R. EASTERLIN 2,630,483

TELEGRAPH REPEATER SWITCHING SYSTEM

Filed Dec. 14, 1951 5 Sheets-Sheet 4

INVENTOR.
P. R. EASTERLIN
BY
[signature]
ATTORNEY

March 3, 1953 P. R. EASTERLIN 2,630,483

TELEGRAPH REPEATER SWITCHING SYSTEM

Filed Dec. 14, 1951 5 Sheets-Sheet 5

*INVENTOR.*
P. R. EASTERLIN

*BY* V. F. Presson
ATTORNEY

Patented Mar. 3, 1953 2,630,483

UNITED STATES PATENT OFFICE 2,630,483

TELEGRAPH REPEATER SWITCHING SYSTEM

Philip R. Easterlin, Valley Stream, N. Y., assignor to The Western Union Telegraph Company, New York, N. Y., a corporation of New York Application December 14, 1951, Serial No. 261,627

18 Claims. (Cl. 178—2)

This invention relates to printing telegraph network switching systems of the inverse neutral repeater type, and more particularly to an inverse repeater network in which printer stations in out offices in different cities or locations readily may connect themselves into or out of communication with any one, two or more of the other printer stations in the network and without interfering with any other connections currently set up between any two or more of the stations.

When inverse neutral repeaters are employed in a telegraph network, each telegraph station and associated line is connectable into a group through its own individual repeater, and a multiple conductor extends from each of these repeaters; two or more such conductors are electrically connected in multiple to provide a common electrical point. This common point in each repeater is terminated in battery of the same potential and magnitude for transmitting to and receiving signals from the other repeaters of the group. Any repeater when sending toward the multiple connects ground to the multiple and transmits signals simultaneously to all other repeaters currently connected in the group. This circuit differs from the conventional make-break neutral circuit in which a closed electrical circuit and attendant current flow represents a marking signal, while an open circuit and no current flow is interpreted as a spacing signal. Instead, the relays in each repeater which receive signals from the multiple circuit are arranged to interpret the no-current interval in this circuit as a marking signal and conversely as a spacing signal when current flows. The four relays which repeat the signals in each repeater are connected to the multiple circuit so that the main line and sending relays function as senders, while the transmitting and receiving relays operate as receivers. In other words, the main line and sending relays transmit signals to the multiple circuit, while the transmitting and receiving relays are arranged to receive signals from the multiple circuit.

The multiple conductor of each repeater terminates in battery of the same polarity and magnitude for the marking condition, and therefore no current flows for this condition, and since ground is connected to the common electrical point for any spacing condition, the current conditions in any multiple connection when it is receiving from the common point, or multiple circuit, are unaffected by the addition or subtraction of another repeater to or from the concentration group. When transmitting towards the common point, however, there is a change in magnitude of the spacing current in the multiple connection, from the single spacing contact to the common point, as the number of connected repeaters is changed, and this results in the introduction of undesirable transmission characteristics in the form of biased signals. This is because the amount of spark protection for the transmitting contacts should vary with the number of inductive relay windings connected to the multiple circuit at any one time, but it is impractical to devise a variable spark killer for this purpose, and heretofore substantial bias has been introduced as a result of varying the number of repeaters which are connected at any one time.

It is often advantageous to employ the Morse code for purposes of testing and regulating the apparatus in a network switching system of the character referred to above, and hence Morse operators who have been trained in testing and regulating procedures are preferred. However, most commercial telegraph business is now conducted by means of telegraph printers and the use of the Morse code is steadily declining, so that new operators are generally trained as teleprinter operators, and there is a resulting dearth of Morse operators. Due to this transition from Morse to teleprinter methods, it is desirable that the switching system be capable of operation, particularly for testing and regulating purposes, either by Morse signals or teleprinter signals.

One of the objects of the invention is to provide a telegraph network switching system of the inverse neutral repeater type in which printer stations may be switched into or out of the network either in response to selection code signals of irregular length or in response to selection code signals of equal length.

Another object of the invention is a telegraph network switching system of the character described, in which any printer station in the network may connect itself into or out of communication with a desired one, two or more of the other printer stations in the network without interfering with any other connections currently set up between the stations and without waiting for termination of such other connections.

An additional object is to provide switching means which enable any printer station in the network to select with one operation any of a plurality of preselected groups or combinations of two or more other printer stations in the network, thereby to broadcast a message to the selected combination of stations.

Further objects include the provision of means to enable the number of repeaters connected together into one inverse neutral multiple circuit to be increased without unduly increasing the current which the contacts of any sending relay have to make and break; to prevent transmitting or receiving relays in such a system from showing a marking bias when receiving signals from the multiple circuit; and to cause the amount of spark protection for each sender to vary appropriately in accordance with the number of transmitting and receiving relays connected to the multiple circuit at any one time.

The foregoing and other objects and advantages of the invention will be apparent from the following detailed description of one illustrative embodiment thereof, taken in connection with the accompanying drawings in which.

Figure 1:
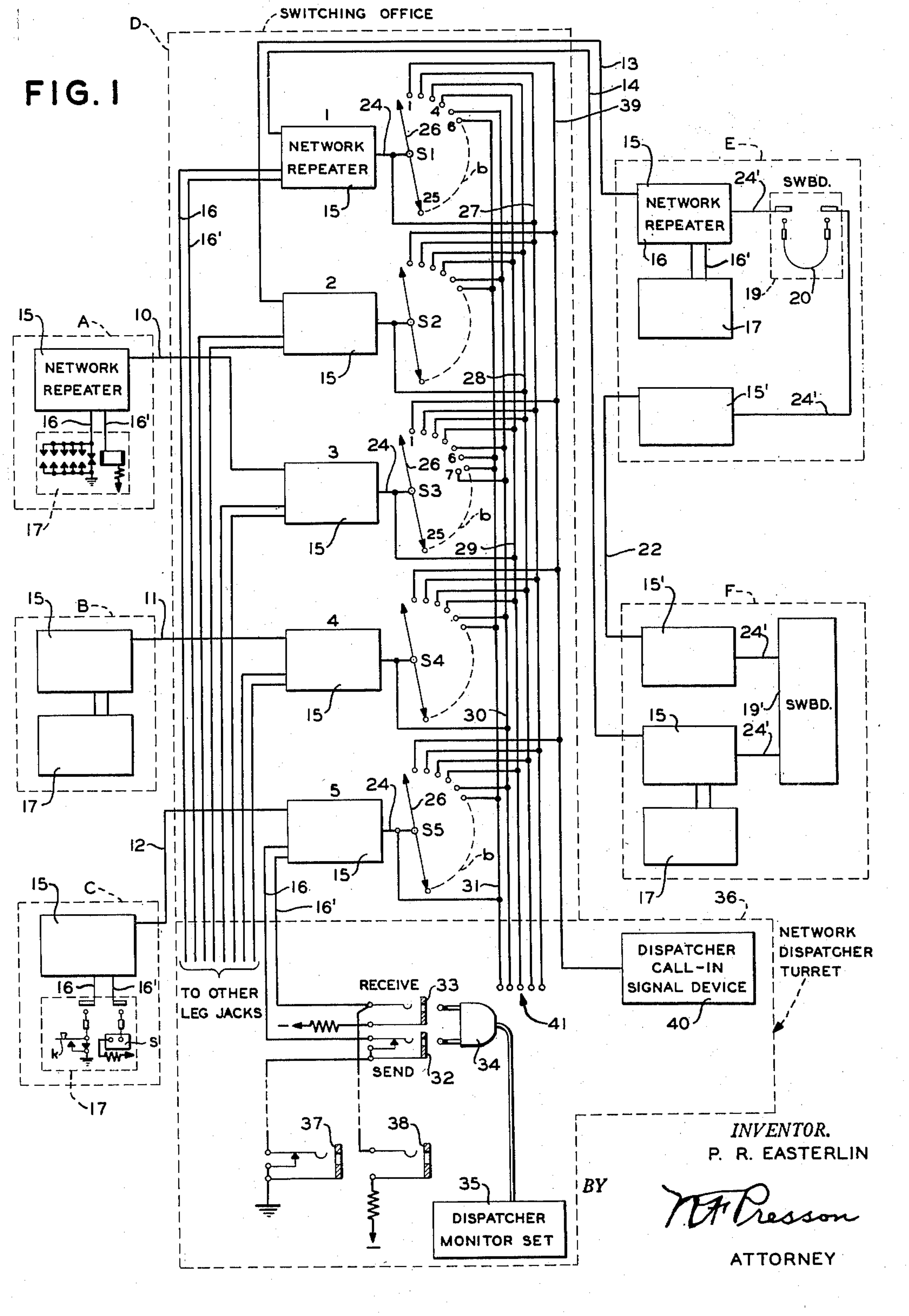
Fig. 1 illustrates diagrammatically an inverse neutral repeater and switching system arranged for half-duplex teleprinter operation, and embodying the principles of the instant invention.

Referring to Fig. 1, there are a number of out offices or stations A, B, C, E and F which respectively are connected by telegraph lines 10, 11, 12, 13 and 14 to a switching office D. The switching office D may be located in one city, for example, in Chicago, and the offices A, B and C may be located in other cities in the network or they may represent send-receive printer stations in the same city. Out office F may be located in another terminal city, for example, New York, and office E may be an intermediate station between New York and Chicago, such as Buffalo. Each of the out offices embodies a network repeater 15, described in detail hereinafter, connected to the lines 10 to 14. In offices A, B, C, D and E each of the repeaters 15 is connected by sending and receiving legs 16 and 16' to a sub-set 17 which comprises sending and receiving telegraph apparatus such as a keyboard printer that preferably is a split printer as indicated in office A of Fig. 1, and which for testing and regulating purposes may include a Morse key *k* and sounder *s* as indicated in office C. The term "keyboard printer" as here employed refers to a telegraph printing instrument in which the outgoing signals, which are initiated by a keyboard on the instrument, are printed by the same mechanism that prints the incoming signals. A "split printer" has the mechanisms of the keyboard printer, but only the incoming signals are printed thereby; such a printer is commonly used in a system for half-duplex operation. In the intermediate office E the network repeater 15 has a multiple connection 24' that extends to a jack in an auxiliary switchboard 19 so that it may be connected, through a patching cord 20 and a second multiple connection 24', to a network repeater 15' and telegraph line 22 to the office F. At the latter office the repeater 15' is similarly connected through a connection 24' to an auxiliary switchboard 19' so that it may be extended, by means of a patching cord, to a local branch office or printer station. Office F thus may be connected to the switching office D either directly over line 14 or through the intermediate office E over lines 22 and 13.

*Office selection equipment in switching office*

Figure 5:
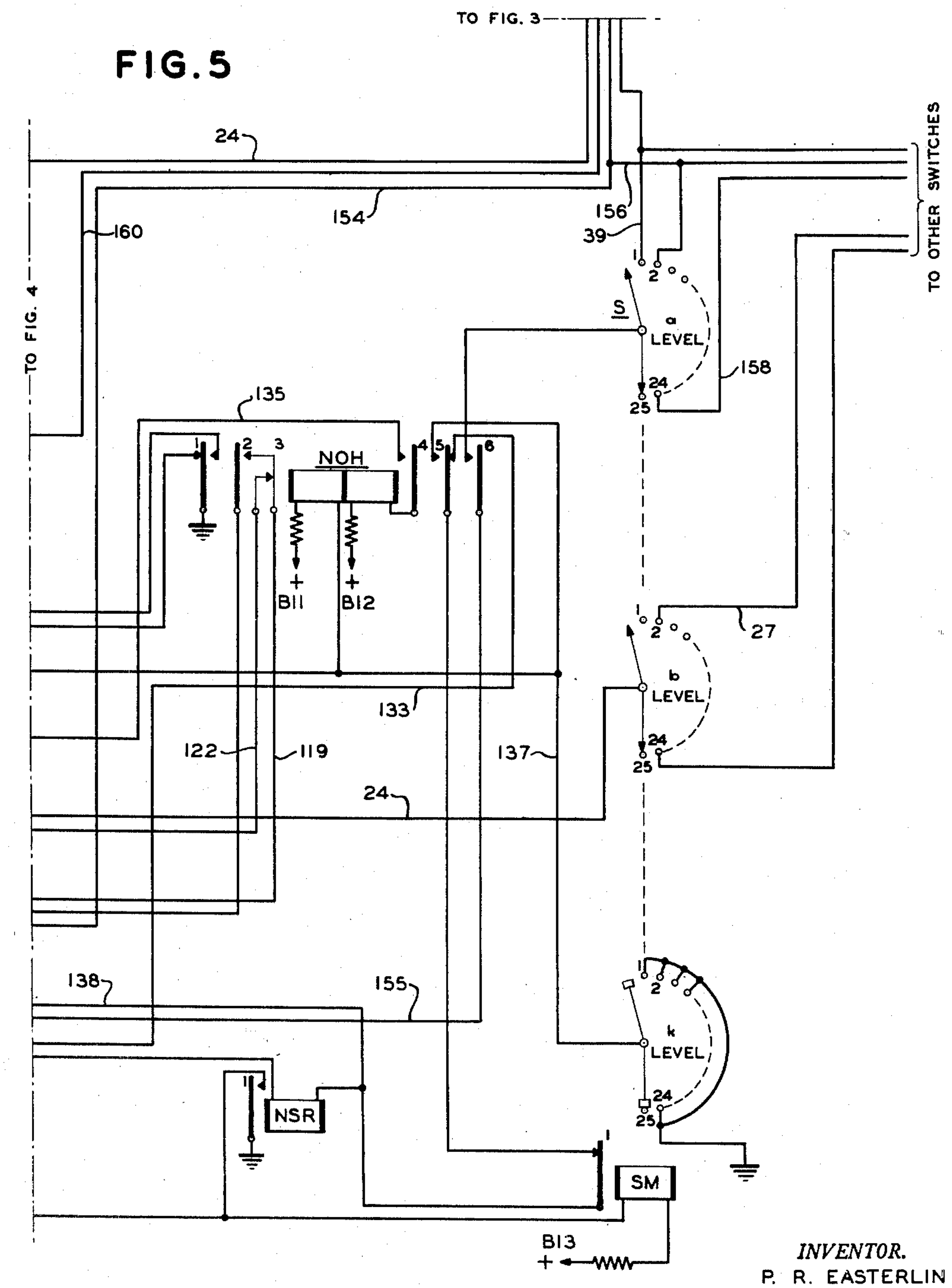

In the switching office D each of the lines 10 to 14 terminates in an individual network repeater 15, and these repeaters #1 to #5 respectively have five individual rotary selecting switches S1 to S5 associated therewith. Each repeater is connected by a multiple circuit 24 to the wiper 26 of a selection bank *b* of the switch and also to one of the conductors 27 to 31 of a group which are connected in multiple to the series of contact points of the banks *b* of the switches. Each rotary switch has 25 points and at least three banks or levels of contacts, of which only one level *b* is shown in Fig. 1; the three banks and the stepping magnet of the switch are shown in Fig. 5 described hereinafter. Also located at the switching offce is a network dispatcher turret 36 which provides central control of the complete system with facilities for monitoring, connecting or disconnecting any combination of repeaters. For these purposes the legs 16 and 16' of the #1 to #5 network repeaters respectively are connected to send and receive leg jacks 32 and 33 into which a twin plug 34 of a monitor set 35 may be inserted. From the jacks 32 and 33 the legs extend to other send and receive jacks 37 and 38 which, for example, may be located in the testing and regulating department of a telegraph company which operates and maintains the network. The multiple group connected to the contact points of the banks *b* of the various rotary switches includes a conductor 39 that terminates in a dispatcher call-in signal device 40 which is energized when any of the rotary switches selects point 1 on its bank *b*. The conductors 27 to 31 of the multiple group extend to multiplying jacks, indicated at 41, to enable the dispatcher to manually interconnect, by means of patch cords, any of the repeaters whenever desirable or necessary.

The switching system is designed to provide a half-duplex Morse or teleprinter network wherein any one of the separate telegraph circuits or branches may automatically connect to any of the others within the network, and this is accomplished by connecting the multiple conductor 24 of two or more repeaters 15 together. To selectively connect to any desired branch, selection code signals are transmitted from any intermediate or terminal out office of any of the outlying branches into the switching office D. The switching equipment at D responds to these signals and steps a particular rotary switch S1 to S5 one step for each spacing signal received until the wiper arm 26 of the switch has been stepped to the proper contact point on the bank *b* to connect the multiples 24 of the two repeaters together. The selection or stepping signals may be transmitted either from a Morse telegraph key by producing spacing signals of regular or irregular length, or from the keyboard of a teleprinter using any permutation code group including its start pulse in which there is but one transition from spacing to marking, thereby to advance a particular rotary switch S1 to S5 one step for each such code group transmitted, as from the "Blank," M, O, T, V or "Letters" keys. If desired, however, a teleprinter character which includes two or more transitions from spacing to marking may also be used, such as the characters A, B, C and E, each of which with its start pulse would cause two spacing or stepping signals to be transmitted, or characters such as D, F and J which would cause three spacing or stepping signals to be transmitted.

In the particular multiple wiring arrangement illustrated in Fig. 1, the wiper 26 of any switch S1 to S5 if stepped to contact 1 on the associated bank *b* will select the dispatcher's call-in device 40; when the wiper is stepped to contact 2, 3, 4, 5 or 6, this effects selection of a network repeater #1 to #5, respectively. Also, the multiple arrangement readily enables any printer station in the network to select with one operation any of a plurality of preselected groups or combinations of other printers' stations in the network thereby to broadcast a message to the desired stations. For example, and as shown in Fig. 1, if the wiper 26 of rotary switch S3 associated with office A is stepped to position 7, the wiper will engage two contacts, one of which contacts is connected to multiple conductor 31 and hence network repeater #5, and the other is connected to multiple 30 and hence network repeater #4, whereby office A may broadcast to offices B and C. The two contacts at position 7 on the switch bank *b* of S3 are shown as engageable simultaneously by the switch arm 26, although in practice it is more feasible to employ another bank of contacts similar to bank *b* and two switch wipers 26 which are electrically connected in multiple and operate in unison in order to effect group selection. If it were desired to group three or more stations for broadcast purposes, additional banks of contacts similar to *b* could be employed with additional switch wipers 26 for connecting the several contacts in multiple to broadcast a message to the several stations or offices. The wiring between the switch banks and the multiple is, in practice, interconnected through terminal blocks on a distributing frame whereby changes in the multiple arrangement may readily be effected.

*Sequence of operations in effecting selection of a desired office*

In order that one office may select another office, the operator or attendant at the calling office, for example, at station A, will depress and release a timed open push button corresponding to button 95, Fig. 3, located either on its network repeater 15 or an associated network sub-set 17, as hereinafter described in connection with the circuit details of Figs. 2 to 5. This causes the network repeater to transmit a timed open "initiate" signal over the main line 10 to the network repeater #3 located at the switching office D of Fig. 1. This open signal preferably has a duration of the order of 7 seconds, although this interval may vary within considerable limits depending upon the constants of the associated timing circuit employed. While the timed open signal is being transmitted, a "selection signal" lamp corresponding to neon tube 102, Fig. 3, on the network repeater or associated sub-set at the calling office A will burn steadily. The switching equipment associated with network repeater #3 at the switching office will respond to the "initiate" signal and will transmit back to office A, a "go ahead selection" signal, consisting of a timed open signal which extinguishes the "selection signal" lamp 102. The office A will now transmit the proper selection code, for example, six spacing pulses for connection to out office C. Rotary switch S3 of the switching office will be stepped one point for each spacing pulse, stopping on the point 6 of bank *b*. As hereinbefore stated, these selection pulses may be transmitted by opening and closing a Morse key or by operating the keys of a teleprinter keyboard so as to send the required number of spacing selection pulses.

When the selection code has been transmitted, the timed open push button at the calling office A will again be depressed and released by the operator or attendant, and this causes the network repeater to transmit a "selection completed" signal to the switching office. This signal, also a 7-second timed open, again operates the selection signal lamp 102 at calling station A. The switching equipment responds to this signal and connects the multiple conductor 24 of network repeater #3 through rotary switch S3 to conductor 31 and thence to the multiple conductor 24 of network repeater #5. When this connection is made, the switching equipment transmits a timed open of approximately 100 milliseconds to station A, which blinks the selection lamp and indicates that the connection has been completed. Out station A is now connected through to out office C. In order to disconnect, the operator or attendant depresses the timed open push button at out office A which transmits a third 7-second timed open to the switching office and this disconnects the multiples of network repeaters #3 and #5 and causes rotary switch S3 to return to its home position on point 25.

*Detailed description of network repeater and switching office circuits*

Figure 2:
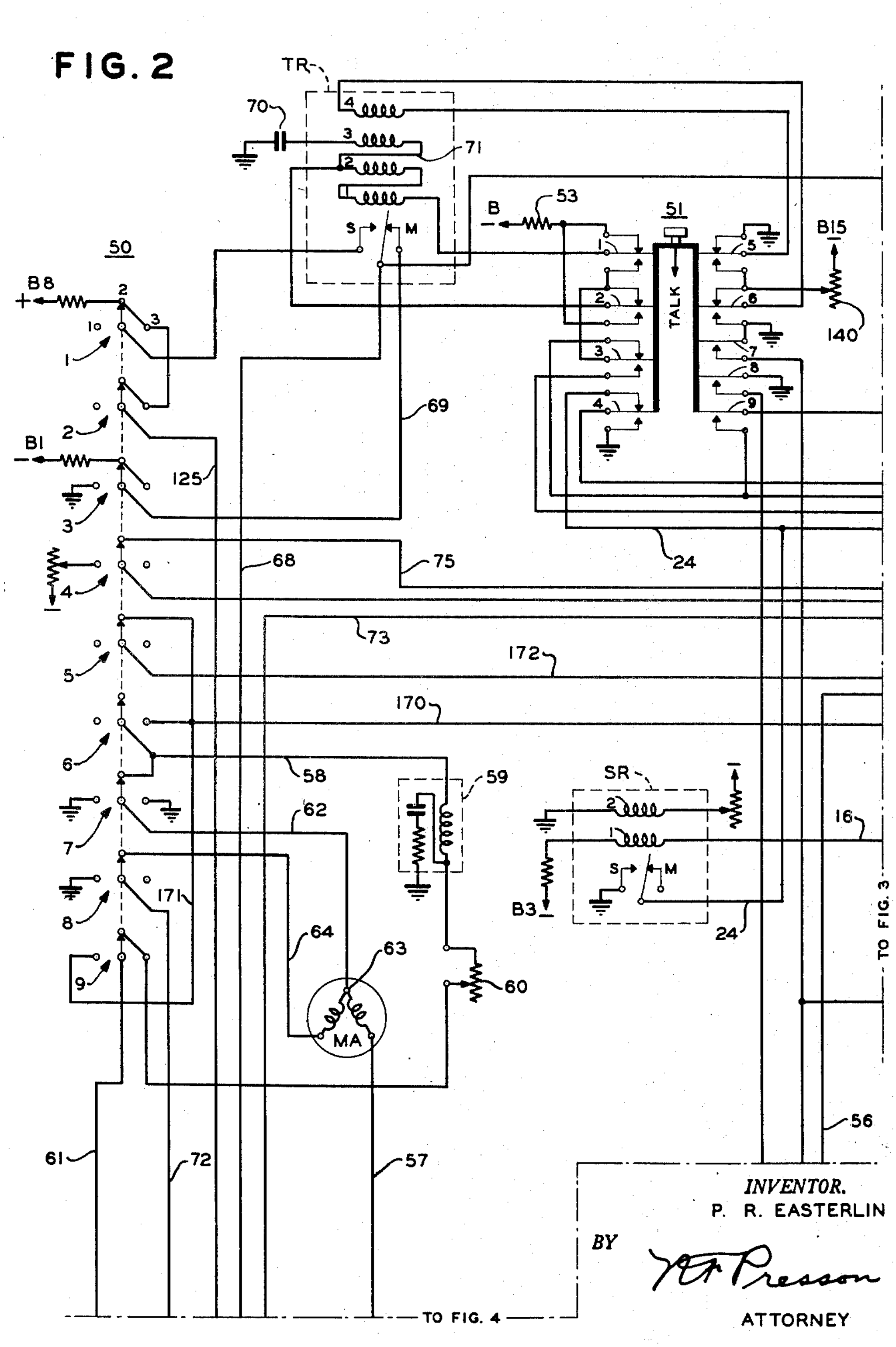
Figs. 2 and 3 show circuit details of a network repeater and associated network sub-sets as employed in the system of Fig. 1.

The various offices or stations operate on the half-duplex principle, as hereinbefore stated, but the lines 10 to 14 which interconnect the out stations with the switching office may operate either on full duplex principle, or by means of carrier currents or by two-directional circuits in known manner. Figs. 2 and 3 show the specific circuit arrangements of a network repeater and associated network sub-sets. This apparatus is employed in each of the out offices A, B, C, E and F, as well as in the switching office D. At the switching office, in addition to the foregoing apparatus, there is also switching control equipment associated with each network repeater, such equipment being shown in Figs. 4 and 5. The network repeater comprises essentially a transmitting relay TR and a sending relay SR, Fig. 2, and a main line relay MLR and a receiving relay RR, Fig. 3. Each of these relays may comprise a type of polar relay commonly employed in telegraph practice, and each of the relays usually has four windings 1, 2, 3, 4 connected in various circuit arrangements as required for the operation of the system. The sending relay SR of Fig. 2 also has four windings, although two of the windings are not employed in the present system and hence are not shown on the drawing.

Fig. 2 discloses a line switch 50 which comprises nine rotary switch elements designated 1 to 9 and all manually operable simultaneously by a common shaft to either of three positions identified as positions 1, 2 and 3 at switch element 1. The rotatable switch arms and associated contacts are all electrically insulated from the common operating shaft. When the arms of the line switch are in position 1, the system is adapted for carrier operation over the various telegraph lines 10—14 of Fig. 1; in position 2 of the line switch the telegraph lines are adapted for full duplex operation; and in position 3 of the switch the system is adapted for 2-wire directional operation. For purposes of illustration, the switch is shown in position 2 which enables full duplex operation over the lines extending between the out offices and the switching office.

Figure 3:
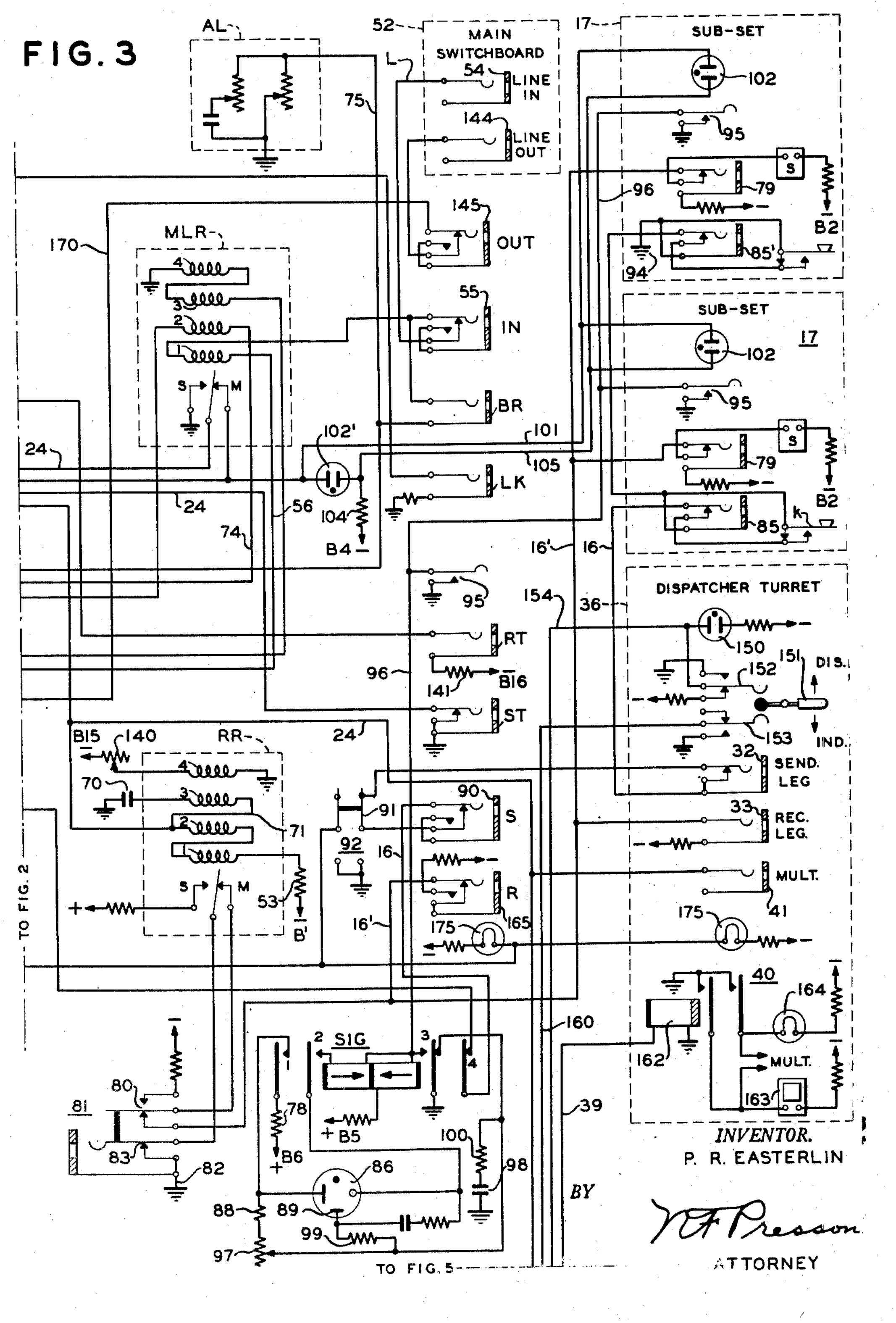

A "Talk" switch 51 in Fig. 2 is employed for terminating the main line relay MLR and the transmitting relay TR in a local test circuit whereby when the switch 51 is manually operated in the direction indicated by the arrow, a testing and regulating set may be inserted in jacks RT and ST, Fig. 3, for main line testing purposes, the print magnet of the teleprinter being connected to the receiving talk jack RT and the keyboard of the teleprinter being connected to the sending talk jack ST. Operation of the talk switch 51 to the talk position also separates the multiple connection 24, with its associated sending and receiving relays SR and RR, from the main line portion represented by relays MLR and TR of the repeater in order to permit continued operation over the multiple connection 24 to other repeaters while the main line portion TR and MLR is being regulated.

In accordance with standard differential duplex theory, negative battery for the idle condition on the line will be received from the distant out office, such as office A shown in Fig. 1. All four relays TR, SR, MLR and RR in each repeater will be held to their marking contacts M during the idle circuit condition. The main line and sending relays MLR and SR of each repeater will be held to their marking contacts by a closed line and sending leg circuit, respectively. However, the transmitting and receiving relays TR and RR in each repeater are held to their marking contacts M by a local circuit, equivalent to a bias, of approximately 55 milliamperes through their respective windings 4 which have one-fourth as many winding turns as the combined operate windings 1 and 2, the latter being used to operate these relays to their spacing contacts S. With all relays in the connected repeaters held to their marking contacts, the potential on any portion of the multiple circuit 24 with respect to ground is negative, preferably 120 volts negative. This voltage emanates in a parallel manner from each transmitting and receiving relay TR and RR, and can be traced from negative battery B, Fig. 2 and Fig. 3, through a 4000 ohm resistor 53, through the windings 1 and 2 in series aiding of each relay, and through contacts of the unoperated talk switch 51 to the common multiple circuit 24.

Assuming that the sending relay SR of a network repeater, in response to a spacing signal transmitted from a network sub-set connected to its sending leg 16, operates its armature to the spacing contact S, ground on this spacing contact, as seen in Fig. 2, will be applied to the multiple circuit 24 and this will cause a parallel current flow of approximately 28 milliamperes through windings 1 and 2 in series aiding from each of the transmitting and receiving relays TR and RR in the connected repeaters. This circuit for each relay TR and RR may be traced from negative battery B, Figs. 2 and 3, resistor 53, windings 1 and 2 of the relay, over the multiple circuit 24 to ground on the spacing contact S of the sending relay SR in the sending network repeater. This current through the windings 1 and 2 of each TR and RR, while less than the current of 55 milliamperes flowing through the winding 4 of the relay acting to hold the relay to the marking contact, exerts a force twice as great, which operates each of these relays to its spacing contact. Each transmitting relay, having operated to the spacing contact, transmits a spacing signal over its respective main line telegraph branch. Similarly, each receiving relay responds accordingly and causes a spacing signal to be transmitted over its respective receiving leg 16′ to the network sub-sets connected to the drop circuit.

Upon closure of the sending leg 16, the sending relay SR of the repeater returns to its marking contact, removing the ground from the multiple circuit which in turn opens the 28 milliampere circuit through the windings 1 and 2 of all transmitting and receiving relays. The 55 milliampere current through the windings 4 of these relays then operates the armatures to the marking contacts which closes all main line and receiving leg circuits. In this manner, any main line or sending relay MLR or SR located in a network repeater having its multiple conductor connected with that of other repeaters may transmit signals which are received by the transmitting and receiving relays in all other repeaters currently connected in the network.

The receiving relay RR in each repeater is arranged to follow all signals transmitted to the multiple circuit 24. However, to avoid breaking back on signals received over its respective main line branch and transmitted to the multiple circuit by the main line relay, the windings 1 and 2 of the associated transmitting relay TR are connected through the marking contact M of the main line relay MLR to the multiple circuit. Therefore, while a main line relay responds to signals from its respective main line, the spacing operate circuit for the associated transmitting relay through its windings 1 and 2 is opened and this relay will be held to the marking contact by the lock circuit through its winding 4.

As above stated, negative battery will cause main line relay MLR, Fig. 3, normally to remain on its marking contact M, and when a reversal to the positive polarity is made by the distant out office the main line relay MLR will accordingly respond and operate to its spacing contact S. Signals transmitted over any of the telegraph lines, either to or from an out office, will enter any network repeater such as over line 10 from office A of Fig. 1, and are received through an associated "Line in" jack 54 on the main switchboard 52, Fig. 3. From jack 54, the line L extends through break contacts of a jack 55 to the operate winding 1 of the main line relay MLR, and thence over a circuit which includes conductor 56, windings 1 and 4 in parallel of a monitor relay MR, Fig. 4, conductor 57, right hand winding and apex 63 of a differential milliammeter MA, Fig. 2, conductor 62, switch member 7 of the line switch 50, conductor 58, anti-noise set 59, variable resistance 60, switch element 9 of the line switch 50, conductor 61, armature 1 and break contact of an "initiate request" relay NIR, Fig. 4, conductor 65, break contacts 2 of a manually operable "close-out" switch 67, conductor 68, armature or tongue of the transmitting relay TR, Fig. 2, and its marking contact M, conductor 69 and switch element 3 of the line switch 50 to negative marking battery B1.

During the idle condition of the line L and prior to the reversal of polarity by the out office, the negative marking battery B1 of Fig. 2 was applied to the artificial line winding 2 of the main line relay MLR, over a circuit which includes the artificial line AL, Fig. 3. This circuit, from the apex 63 of the differential milliammeter MA, includes its left-hand winding, conductor 64, switch element 8 of line switch 50, conductor 72, windings 2 and 3 in parallel of the monitor relay MR, Fig. 4, conductor 73, winding 2 of relay MLR, Fig. 3, conductor 74, switch element 4 of line switch 50, Fig. 2, conductor 75, and artificial line AL, Fig. 3, to ground.

The main line relay MLR will respond to spacing (positive polarity) signals transmitted by the distant out office A and will operate its armature to the grounded spacing contact S for each such spacing signal transmitted to the repeater and applies a ground to the multiple conductor 24, which will cause the receiving relay RR to likewise operate to its spacing contact S for each spacing signal: This circuit includes the multiple conductor 24, armature 4 and break contact of the talk switch 51, Fig. 2, and windings 2 and 1, in series, of relay RR, to negative batery B'. The current thus flowing through these windings exerts a force in a direction to move the armature of the relay to its spacing contact S and overrides the force exerted by a biasing winding 4 of the relay RR, which is in a direction normally to hold the armature on the marking contact M. In its marking position, the armature and marking contact of relay RR apply a marking condition to a local receiving network sub-set 17 over a circuit which may be traced as follows: Negative battery B2 in any of the sub-sets 17, Fig. 3, Morse sounder *s*, tip and tip-normal contacts of a receiving leg jack 79, receiving leg 16', break contacts 80 of a meter jack 81, and marking contact M and armature of relay RR, to ground 82 through break contacts 83 of the meter jack. By reason of the foregoing circuits, incoming signals received by the main line relay MLR cause the receiving relay RR to operate accordingly and in turn causes operation of the Morse sounder *s* in the associated sub-set 17 or causes operation of the print magnet of a teleprinter of the sub-set which is connected by plug and cord connections in jack 79 to the receiving leg 16' of the circuit. It will be understood that either the sounder or the teleprinter may be used to receive the incoming signals.

It should be noted at this point that operate windings 1 and 2 of the transmitting relay TR of Fig. 2 are connected to the multiple circuit 24 only through the marking contact M and armature of main line relay MLR. The transmitting relay TR will, therefore, not be operated or affected by the incoming signals received over main line relay MLR and which are transmitted to the multiple circuit 24, because the series circuit which otherwise would operate transmitting relay TR in the same manner as that of receiving relay RR, is opened when the armature of relay MLR leaves its marking contact.

Signals are transmitted to and from a distant out office by means of a key *k* or a teleprinter keyboard inserted in the sending leg jack 85 of any network sub-set 17, Fig. 3. These signals are on a make-break basis, i. e., current and no-current, and cause the sending relay SR of Fig. 2 to operate to its spacing contact S for an open signal and to its marking contact M for a closed signal. The relay normally is held in its marking position by its biasing winding 2. The sending circuit may be traced from negative battery B3 through winding 1 of the sending relay SR, leg 16 including the break contact 4 and armature of signal relay SIG, tip contacts of a sending leg jack 90, closed contacts 91 of a sending leg "cut" switch 92, tip contacts of a sending leg jack 32 in the network despatcher turret 36, and tip contacts of jack 95 in sub-set 17 to the key *k*, when a Morse key is employed, or through the keyboard contacts of a teleprinter when plugged into jack 85, and through closed contacts of jack 85' of an additional sub-set 17 and thence to ground at 94. Opening and closing this sending leg circuit causes the armature of sending relay SR to operate to its spacing contact for an open signal and to its marking contact for a closed signal. This relay, when operated to its spacing contact, will apply a ground from its spacing contact S and armature to the multiple circuit 24.

As previously explained, a ground on the multiple conductor 24 will cause receiving relay RR to operate to its spacing contact which in turn will transmit a spacing signal back to the network sub-set 17 for operation of the teleprinter or sounder. In addition, the ground applied by sending relay SR to the multiple circuit 24 will also cause transmitting relay TR to operate to its spacing contact in the same manner as previously described for the receiving relay RR. Operation of transmitting relay TR to the spacing contact will, therefore, reverse the main line battery applied to the distant office in the duplex circuit and cause the distant office main line relay to operate to its spacing contact. In this manner, signals originating from a network sub-set 17 are transmitted to the distant offices. As heretofore described, multiple conductor 24 when joined with that of a similar multiple conductor from a second, third or other repeater will now serve as a common multipling point, which will allow all such repeaters so connected to transmit to or receive signals originated by any one repeater on a half-duplex network basis.

*Detailed description of selection circuits*

The selection procedure for the network switching system requires an exchange of timed open signals for controlling the switching functions between an intermediate or terminal out office and the switching office. These signals are sent and received simultaneously over the main line facilities of the repeater on a duplex basis. However, the sending and receiving legs 16 and 16', respectively, which are extended to each sub-set, operate in unison on a half-duplex arrangement to provide home record copy, and when the sending leg is opened, the receiving leg also responds to this open signal. Therefore, means must be provided at the sub-set to receive a timed open signal from the switching office while a similar signal is being sent over the sending leg from the sub-set. This is accomplished by the use of the "selection signal" lamp hereinbefore referred to, located on each sub-set which is wired to the marking contact of the main line relay MLR, and this lamp will recognize and indicate when a controlling timed open signal is received from the switching office.

Also located on each sub-set is a "timed open" push button, such as the button 95 seen in Fig. 3, for the purpose of transmitting timed open signals to the switching office. Once this push button is depressed, an electronic timer including the signal relay SIG, Fig. 3, and a gas tube 86, is actuated in the repeater and functions to open and later close the sending leg 16 and this causes a uniform timed open signal to be transmitted to the switching office.

The sending leg 16 is wired through contacts 4 of the signal relay SIG, which contacts are closed when the signal relay is released. In order that an out office may select another office, the operator or attendant at one of the network sub-sets 17 located, for example, at out office A, will depress and release the timed open push button 95, Fig. 3. Closing the push button applies ground through a circuit including conductor 96 and right hand winding of signal relay SIG to positive battery B5. Relay SIG operates and locks up to ground through its inner right hand make contact and armature 3, and this starts a timing circuit which will later fire the gas tube 86, which preferably is an OA4G type of tube, and release the signal relay. Operation of the signal relay, at its contacts 4, opens the sending leg 16 which causes the sending relay SR of Fig. 2 to move to its spacing contact which grounds the multiple circuit 24 and transmits a spacing signal to the switching office. While this signal is being sent, all selection signal lamps 102 on the sub-sets will operate from negative battery B4 through a resistor 104, conductor 105, neon lamps 102, and conductor 101 to the marking contact and armature of the main line relay MLR, and over the multiple circuit 24, through contacts 4 of Talk switch 51, to ground on the spacing contact S of the sending relay SR. In approximately five seconds the equipment at the switching office responds to this timed open and transmits back to the out office repeater a timed open signal which will operate the main line relay MLR to its spacing contact, extinguishing the selection signal lamps 102. Two seconds later, or approximately seven seconds after the sending leg 16 was opened by the operation of the signal relay SIG, the OA4G tube 86 in the repeater fires and this releases the signal relay. The release of the signal relay extinguishes the tube 86 and terminates the timed open signal to the switching office by closing the sending leg 16 at the contacts 4 of the signal relay.

The operation of the electronic timer is as follows: Associated with the trigger 89 of tube 86 is a potentiometer 97 the position of whose slider determines the timing of the circuit, and a 2 mfd. condenser 98, the latter being discharged when the signal relay is released. When the timed open push button of any sub-set is depressed and released, the signal relay is operated from positive battery B5 through its right hand winding, conductor 96 and push button 95 to ground. Once operated, this relay locks up to ground through its right hand make contact and armature 3, and opens the sending leg 16 at armature and back contact 4, as previously described. In addition, contacts 1 and 2 of the signal relay close two circuit paths which function to start the timing of the tube 86. Positive battery B6 through its associated resistor 78 and contacts 1 of the signal relay is applied to the anode of the gas tube, and through resistor 88, potentiometer 97 and resistor 99 to the trigger 89 of the tube.

Associated with the trigger is the 2 mfd. condenser 98 which, while charging, keeps the voltage on the trigger to a value which is insufficient to fire the tube. Approximately seven seconds later the charge on this condenser allows the potential on the trigger to reach a value which is adequate to fire the tube. The tube fires and a current flows from positive battery B6 through the tube, contacts 2 of the signal relay, left hand winding of the relay, and contacts 3 to ground. This current passes through the left hand winding in a direction to oppose the current in the right hand winding and because of the greater number of turns in the left hand winding, passes the flux through zero which releases the signal relay. The release of the relay recloses the sending leg at contacts 4, discharges the condenser 98, and extinguishes the tube by removing positive battery from the anode. Illustrative values for the various resistors associated with the timing circuit, when B6 represents 120 volts, are approximately: resistor 78, 1500 ohms; resistor 88, 1.8 megohms; potentiometer 97, 1 megohm, with the slider adjusted for a seven-second open; resistor 99, 100,000 ohms; and resistor 100, 1000 ohms.

It will be understood that all out offices connected to the switching office are able to transmit a timed open signal of the foregoing character from their respective repeaters or network sub-sets in the manner just described. During the transmission of the timed signal, the lamps 102 on the network sub-sets associated with out office A are caused to burn steadily over the circuit hereinbefore described, and which includes the marking contact and the armature of the main line relay MLR and the multiple conductor 24 to ground on the spacing contact of the sending relay SR.

Figure 4:
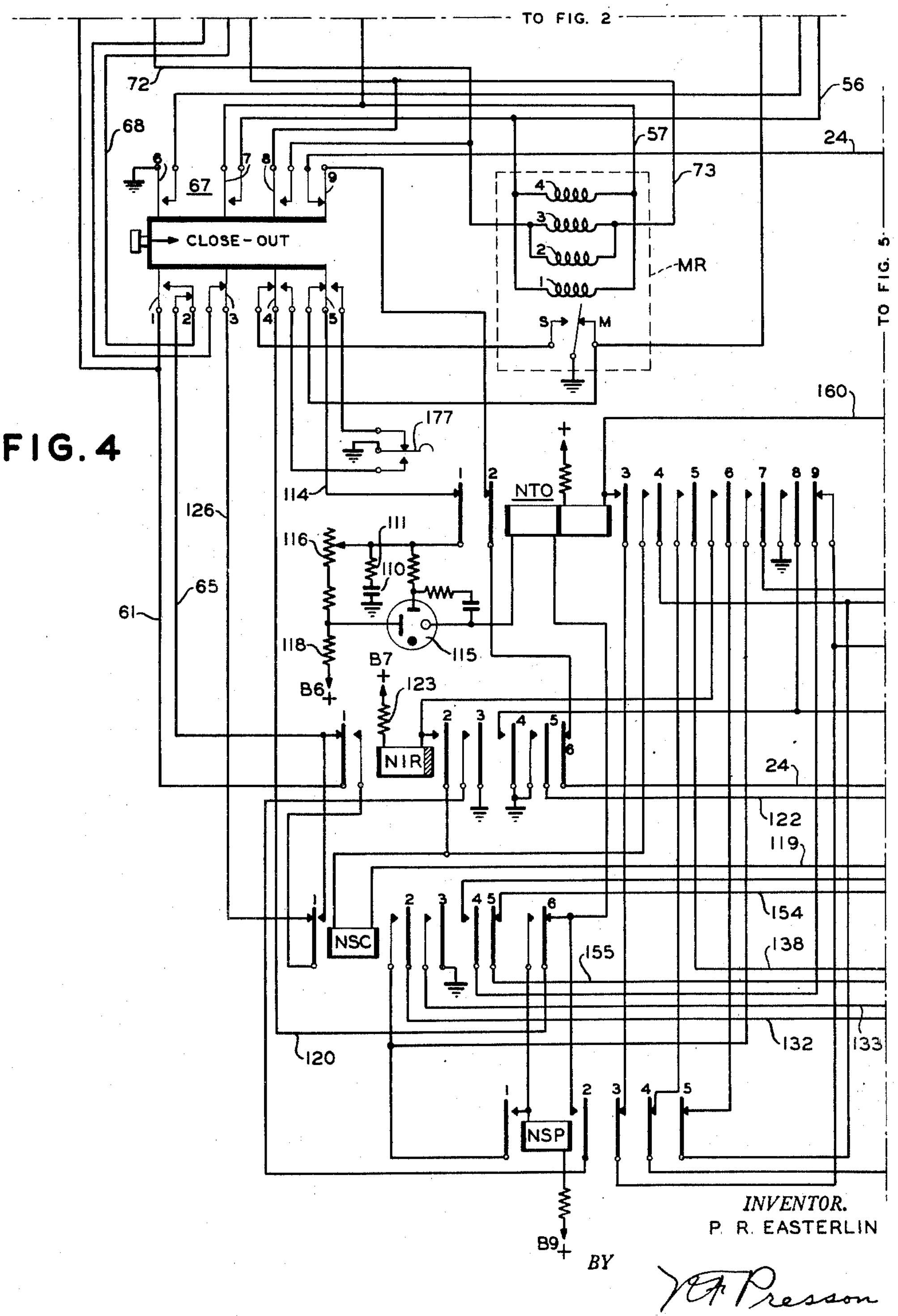
Figs. 4 and 5 show circuit details of switching control apparatus associated with each network repeater located in the network switching office.

*Switching control equipment.*—At the switching office, as previously described, incoming signals from any out office will operate main line relay MLR and will also operate the associated monitor relay MR, Fig. 4, the latter being used specifically for recognizing selection signals from any out office and which accordingly actuates the switching control equipment shown in Figs. 4 and 5. Monitor relay MR responds to the timed open signal transmitted from the out office and moves its armature or tongue to the spacing contact. Prior to the actuation of the monitor relay its grounded armature was in contact with its marking contact M, thus maintaining a condenser 110 discharged over a circuit comprising resistance 111, outer left hand armature 1 and break contact of a relay NTO, conductor 114, blade 5 and break contact of the close-out switch 67, and marking contact M and armature of monitor relay MR to ground. Operation of monitor relay MR to the spacing contact removes ground from the condenser circuit and partially prepares an operate path for the left hand winding of relay NTO, to ground on the armature of the monitor relay. Relay NTO does not operate at this time, but instead is operated when a gas tube 115 is fired as hereinafter described.

Removal of the ground from the circuit of condenser 110 allows the condenser to begin charging through a timing potentiometer 116 from a source of positive battery B6. In approximately five seconds, as determined by the position of the slider of the potentiometer, the potential on the trigger of the gas tube 115 will have risen to a sufficient value to ionize the tube which when fired will establish a circuit through the left hand winding of relay NTO traced as follows: Positive battery B6, resistance 118 to the anode of the gas tube 115, thence from the cathode through the left hand winding of relay NTO, break contact and armature 6 of a relay NSC, conductor 120, blade 4 and break contact of close-out switch 67 and thence to the spacing contact S and armature of monitor relay MR to ground. Relay NTO operates and causes the operation of relay NIR from positive battery B7, through resistor 123, the winding of relay NIR, make contact and armature 6 of relay NTO, break contact and armature 5 of relay NSP, and break contact and armature 1 of relay NOH to ground.

The operation of relay NIR at the switching office reverses the main line battery applied to the out office from negative to positive by the actuation of transfer contact 1 of relay NIR. This reversal of polarity takes place during the operate period of relay NIR and the released condition of relay NSC and accordingly actuates the main line relay MLR at the distant out office to its spacing contact. Operation of relay MLR at the out office actuates the selection signal lamps 102 in the associated network subsets signifying the go-ahead selection signal.

The reversal of this duplex main line battery at the switching office when relay NIR is operated and relay NSC is released may be traced as follows: Positive battery B8 at position 2 of unit 1 of line switch 50, Fig. 2, through contact 3 of unit 1, contacts 3 and 2 of unit 2, switch arm of unit 2, conductor 125, break contact and blade 3 of close-out switch 67, Fig. 4, conductor 126, left hand armature 1 and break contact of relay NSC, left hand inner make contact and armature 1 of operated relay NIR, conductor 61, arm and contact 2 of unit 9 in switch 50, contact 3 of unit 9, resistor 60, anti-noise set 59, conductor 58, contact 2 and arm of unit 7 of line switch 50, to the apex 63 of the milliammeter MA which represents the apex of the duplex line circuit between the switching office and the out office. In accordance with the standard theory a reversal of main line battery on the apex 63 of the differential duplex will accordingly cause the main line relay MLR at the distant out office to move from the marking to the spacing contact. As thus described, in approximately five seconds after the beginning of the seven-second timed open signal transmitted by the out office, the switching equipment in turn reverses the polarity of the duplex circuit and accordingly transmits back to the distant out office a spacing signal which actuates relay MLR to the spacing contact and accordingly operates selection signal lamps 102 in network sub-set 17 to indicate to the out office that the switching equipment is in readiness to select.

At the end of the 7-second timed open signal transmitted by the out office, the line is now closed by the application of negative battery from the out office which accordingly operates the main line relay MLR and monitor relay MR from the spacing back to the marking contact. Operation of monitor relay MR to the marking contact releases relay NTO by removing ground from the spacing contact of MR and the circuit previously traced for its operation. The release of relay NTO now removes the ground applied by contacts 1 of relay NOH and which initially enabled relay NIR to operate. Relay NIR, however, remains operated over a path which includes its inner right hand make contact and armature 2, winding of relay NSC, conductor 119, contacts 3 of relay NOH, conductor 122 and contacts 5 of relay NIR to ground. This causes the operation of relay NSC at the completion of the timed open signal from the distant out office.

Operation of relay NSC, at its inner left hand make contact and armature 1 now reverses the main line battery applied to the duplex line circuit from positive back to negative, which in turn causes the distant main line relay MLR to return to its marking contact and therefore extinguishes the selection signal lamps located in network sub-sets 17. The negative polarity applied by this reversal to the apex 63, Fig. 2, of the duplex circuit may be traced as follows: Negative battery B1, unit 3 of line switch 50, conductor 69, marking contact and armature of relay TR, conductor 68, blade 2 and break contact of close-out switch 67, Fig. 4, conductor 65, left hand make contact and armature 1 of operated relay NSC, inner left hand make contact and armature 1 of operated relay NIR, conductor 61, unit 9 of switch 50, resistor 60, anti-noise set 59, conductor 58, unit 7 of switch 50, and conductor 62 to the apex 63 of the duplex circuit.

In response to the operation of the selection signal lamp 102 in the network sub-set 17, the attendant at the out office now proceeds to transmit selection signals consisting of spacing pulses into the switching office. These spacing pulses may be transmitted by means of a Morse telegraph key $k$ or by depressing one or more keys on a teleprinter keyboard to send the desired number of switching pulses for the purpose of stepping the associated selection switch, such as S3 in Fig. 1, to the desired position for selecting the desired office or offices. For each such spacing pulse, the associated rotary switch will now advance one step. Such a rotary switch S is shown in Fig. 5 and includes at least three levels $a$, $b$ and $k$ each of 25 points to which each of three separate wipers simultaneously may be advanced. This switch is advanced one point each time its associated stepping magnet SM is energized and released. The $a$ level of the switch is used for a connection indicator circuit; the $b$ level is the means whereby the multiple connection is selectively established between two repeaters; and the $k$ level is used for homing purposes. As hereinbefore disclosed, two or more $b$ levels may be employed for group selection of the repeaters.

As previously stated, prior to the selection signals being received the associated rotary switch is on its twenty-fifth point corresponding to its home position. Upon receipt of the first spacing pulse or selection signal transmitted by the out office, relay MLR and monitor relay MR will accordingly move their armatures to the spacing contacts for the duration of the spacing signals transmitted by the out office. Operation of monitor relay MR to its spacing contact operates relay NSP from positive battery B9 over a circuit including the winding of relay NSP, make contact and armature 6 of operated relay NSC, conductor 120, blade 4 and break contact of close-out switch 67 to the spacing contact S and grounded armature of monitor relay MR. Upon closure of the line from the distant out office following the spacing pulse, monitor relay MR will move its armature from the spacing to the marking contact; relay NSP remains operated, however, over a circuit from its positive battery B9 through the winding of the relay, contacts 1, armature 2 and make contact of operated relay NSC, conductor 132, winding of relay NSR, through the break contacts 1 of the step magnet SM of the rotary switch, armature 5 and break contact of relay NOH, conductor 133, and make contact and grounded armature 3 of relay NSC. This causes the operation of relay NSR which at its grounded armature and make contact closes a circuit which energizes step magnet SM of the rotary switch from positive battery B13. Energization of the step magnet SM breaks the circuit previously described which held relay NSP and relay NSR operated, causing both of these relays to release. The release of relay NSR opens the contacts which had operated step magnet SM of the rotary switch, and release of this step magnet now causes the spring on the rotary switch to advance the wipers from the twenty-fifth point to the first point; this causes the operation of relay NOH over a circuit comprising positive battery B11, left hand winding of the relay, conductor 137, switch wiper of the $k$ level of rotary switch S and to ground on point 1 of this level. The contact of each end of the wiper of the $k$ level is of sufficient width to engage each succeeding point to which it is stepped before it disengages the immediately preceding point, thereby to maintain the relay NOH energized during the stepping operation, but the contact does not bridge two adjacent points when the wiper stops on any point to which it may be actuated. Relay NOH also locks up from battery B12 over a circuit including its right hand winding, contacts 4 of the relay, conductor 135, and make contact and grounded armature 4 of energized relay NIR. Subsequent spacing pulses from the distant out office will cause relays NSP and NSR to operate which in turn energizes step magnet SM of the rotary switch and accordingly causes the rotary switch to advance one step upon the completion of each spacing signal received from the distant out office.

Upon the completion of the required number of spacing pulses transmitted from the out office comprising the selection code signals (six in this example) the attendant at the out office, by means of the push button 95, transmits a second 7-second timed open signal representing the "selection completed" signal. Depressing and releasing this push button causes the gas tube 86 and signal relay SIG in the out office network repeater to function in a manner previously described to transmit the "selection completed" timed open signal into the switching office. This signal likewise causes the monitor relay MR at the switching office to move its armature from the marking to the spacing contact. This causes the operation of relay NSP, the same as previously described for space selection signal, but at this time relay NSP is prevented from actuating relay NSR or the rotary switch S due to the subsequent operation of relay NTO. In approximately five seconds the gas tube 115 and associated relay NTO will operate as previously described.

Operation of relay NTO, at its break contact and armature 9, will now cause the release of relays NIR and NSC. The release of relay NSC occurs in approximately ten milliseconds while the release of relay NIR due to its slug is delayed for approximately 125 milliseconds. This difference in release times of these two relays, with relay NIR operated and relay NSC released, causes a spacing signal of approximately 100 milliseconds duration to be transmitted to the out office in the same manner previously described for the "go ahead" selection signal. This "selection completed" signal causes the selection lamps 102 in the out office to be momentarily blinked for this time duration, thereby serving as an indicator that the switching equipment has completed the necessary functions in response to the selection code signals which had been transmitted by the attendant at the out office. The calling out office, such as office A, is now connected through to the called office, such as office C, shown in Fig. 1.

Upon completion of the 7-second timed open signal transmitted by the out office into the switching equipment, monitor relay MR accordingly moves from the spacing contact back to the marking contact. Removal of the ground from the spacing contact will now cause the gas tube 115 to extinguish and the associated relay NTO to release. The release of relay NTO will, at its break contact and armature 7, cause relay NSP to release. It should be noted at this point that the operation of relay NSP on the "selection completed" timed open signal did not cause relay NSR and the associated rotary switch S to take an additional step because of the previous release of relay NSC. With the exception of relay NOH which is now operated because the rotary switch is away from its home position, all other relays and the gas tube are released.

The release of relay NTO upon the completion of the second timed open signal which was transmitted by the out office now closes a path for the connection of the multiple conductor 24 from the selecting network repeater to the selected network repeater, such as repeater #3 to repeater #5 shown in Fig. 1. This may be traced as follows: conductor 24 from the selecting network repeater, through contacts 9 of the close-out key 67, contacts 2 of relay NTO, contacts 6 of relay NIR, to the wiper of the *b* level of rotary switch S and to the selected point 6 of this bank of the switch which is wired to repeater #5, as shown in Fig. 1.

The multiple connection of repeater #3 with that of repeater #5 now joins the two respective line circuits of these repeaters into a one-half duplex telegraph repeater circuit. While this connection was actually made by repeater #3, no interruption to an existing connection, which may or may not have been previously established from some other repeater to repeater #5, results from this selection. Had an existing selection and communication been taking place between the selected repeater #5 and one or more other such repeaters, the entrance of repeater #3 into this combined network allowed this repeater to immediately observe all signals being exchanged between these respective repeater branches without interruption. The selecting repeater is thus enabled to determine the instant when the selected repeater line becomes idle, and can then start sending its message to the selected repeater without any delay and without the necessity of testing for busy line conditions. Moreover, the arrangement enables any of the out stations to be connected to an existing network of repeaters, whereby messages readily may be broadcast to any desired group of out stations. Any of the out stations may selectively set up a broacast network comprising the desired stations into a single network independently of any broadcast connection which can manually be set up from the network dispatcher turret 36 in a manner described later. It will be noted at this point that the ability of any station to select any other station does not involve the complication of providing additional guard relays and circuits to prevent connecting to lines which may be busy. The means of determining when a selection has been made to a busy line is evident by the signals which are observed upon the completion of a selection and avoids the loss in time which would result from having to make repetitious selections to busy lines.

Upon the completion of the conversation between the selecting repeater and that of the selected repeater, the disconnect between these two stations must originate from the main line of the selecting repeater. The disconnect is accordingly made from the network subset 17 located at the selecting out office when the attendant depresses and releases the push button 95 which, as previously described, will cause the gas tube 86 and signal relay SIG located in the out office repeater to function again for transmitting a third 7-second timed open signal to the switching office. At the switching office this signal will again operate the armature of the monitor relay MR from the marking to the spacing contact. In approximately five seconds the gas tube 115 and relay NTO will operate.

Operation of relay NTO at its left hand contacts 2 opens the multiple connection 24 which had been established through the wiper of the

*b* level of rotary switch S. In addition, operation of relay NTO closes a self-interrupting circuit for the operation of the step magnet SM of the rotary switch S, which will cause the rotary switch to step to its home position on point 25, which circuit is as follows: Positive battery B13, through the winding of the step magnet of the rotary switch, contacts 4 of relay NSP, contacts 5 of operated relay NTO, conductor 138, break contacts 1 of the step magnet of the rotary switch, through make contacts 5 of operated relay NOH, conductor 135 to the wiper of the *k* level and to ground on points 1 to 25 of this rotary switch bank. The step magnet of the rotary switch accordingly functions on a self-interrupting basis by means of its break contacts 1 which are in series with this closed circuit until the wiper enters upon point 25 of the *k* level on the switch, thus removing ground from the stepping circuit. It will be noted that relay NTO as well as relay NOH will be held operated in a parallel manner to the ground on points 1 to 24 of bank *k* of the rotary switch which as above stated is equipped with a bridging type of wiper, providing make-before-break operation while the switch is stepping. In order to insure that the switch will have ample time to step to the home position on point 25 regardless of whether or not this action is completed before the termination of the 7-second open transmitted by the out office, a right hand locking winding and locking contacts 3 are provided on relay NTO which holds this relay operated until the rotary switch reaches point 25. When point 25 is reached and after the termination of the 7-second timed open from the out office, relay NTO will release and at its contacts 8 will allow relay NOH to release. The switching equipment is now back to the normal or disconnected condition and another selection may be initiated if desired. It will be noted that upon the transmission of the third timed open signal from the out office, no return signal was transmitted by the switching equipment, as in the case of the first and second timed open signals. This feature of not sending back a signal for the disconnect is desirable in instances where an out office neglects to make a normal disconnect, as will be described later.

*Description of certain guard features*

*Failure to disconnect.*—Normally, upon the termination of a selection cut-through in this system, the efficient use of these facilities would necessitate a prompt disconnect by each selecting office. If for some reason, however, the disconnect is not transmitted and later a new selection is attempted from the same office or perhaps at an intermediate office on the same branch circuit, the control signals transmitted from the switching office will make this evident. For example, if a disconnect has not been made, transmitting the 7-second "initiate" timed open to the switching office will perform this disconnect but no "go ahead selection" signal will be received at the out office which normally would extinguish the selection lamp in approximately five seconds. When this signal is not received, the out office will understand that a previous disconnect signal was omitted and shall begin the selection procedure again by depressing the timed open push button 95 on network subset 17.

*Connection to a busy circuit.*—Any intermediate or terminal out office may selectively connect to any other repeater regardless of whether that circuit is busy or not. If a connection is made to a busy circuit, no interference or break-up in transmission will result provided that the selecting office, after connecting, does not proceed to transmit signals. When a connection is made to a circuit already involving two telegraph branches, the three telegraph branches are simply connected into one-half duplex network and the busy condition will be recognized by the reception of signals being exchanged by the two branches. When such a busy condition is encountered, the selecting office may either wait until the circuit is idle or a disconnect can be made. However, to disconnect from any circuit requires the selecting office to transmit the 7-second "disconnect" timed open to the switching office and this signal will interrupt transmission on the circuit for approximately five seconds.

*Successive false opens due to main line failures.*—The equipment at the switching office is arranged to ignore and recycle on certain sequences of false opens which may be introduced on the main line circuit due to wire failures. Successive false opens on the line for time periods of five seconds or more will be ignored provided that no spacing pulses (open signals of less than five seconds) are intermingled between these false opens. The reaction of the switching equipment to each successive false open will be the same as when the "initiate" timed open is received. Also, if one such false open is introduced on the line followed by 25 or more spacing signals, the rotary switch associated with this repeater at the switching office will take one step for each spacing pulse until the home position on point 25 is reached. The switch will remain on this point, recycling the switching equipment without connecting to or interfering with other repeater circuits. In general, a false connection can only be caused by these line failures when two such wrong opens are received separated by one and not more than twenty-four spacing pulses.

The method whereby the switching equipment ignores successive false opens having a time duration of seven seconds or more is as follows: When the line goes open, the monitor relay MR moves its armature from the marking to the spacing contact in the normal manner previously described. In approximately five seconds the gas tube 115 will fire and relay NTO operate, which in turn causes relay NIR to operate. Upon the closure of the line, the monitor relay moves its armature from the spacing contact to the marking contact, which extinguishes the tube and releases relay NTO, as previously described. Relay NIR remains operated over a circuit including the winding of relay NSC, and these two relays remain operated until a second or successive timed open signal is received. Upon the receipt of another false open, the monitor relay again operates to the spacing contact, allowing relay NSP to operate immediately from positive battery B9 through the winding of the relay, contacts 6 of relay NSC, conductor 120, contacts 4 of the close-out key 67, and the spacing contact S and grounded armature of the monitor relay.

If the main line is subjected to false open signals having a time duration of five seconds or longer, the monitor relay will be actuated to the spacing contact while the line is open, and back to the marking contact when the line is reclosed.

On the first such open of this duration, the gas tube 115 will fire and relay NTO will operate, which in turn will cause relay NIR to operate as previously described. Upon closure of the main line circuit, the monitor relay will return to the marking contact, extinguishing the gas tube and releasing relay NTO. The release of relay NTO allows relay NIR to remain operated through a circuit which includes the winding of relay NSC and operates this relay.

The second and subsequent false opens of five seconds or longer cause the monitor relay MR to move to the spacing contact. Relay NSP operates immediately through contacts 6 of relay NSC. Relay NSP prepares a path for the gas tube 115 and relay NTO to operate in approximately five seconds over a circuit from positive battery B6, resistor 118, through the anode and cathode of the gas tube 115, left hand winding of relay NTO, contacts 2 of relay NSP, and contacts 3 of relay NIR to ground. When relay NTO operates, it places a ground ahead of the winding of relay NSC, through right hand contacts 4 of relay NTO to contacts 1 of relay NOH to ground, which causes relay NSC to release. The release of relay NSC closes a circuit through its contacts 6 to hold relay NTO operated until the line is reclosed, at which time the monitor relay MR returns to the marking contact. The release of relay NSC also release relay NSP which precludes the rotary switch from stepping. Upon closure of the line, the gas tube 115 and relay NTO release and allow relay NSC to reoperate, placing it in readiness to receive a spacing selection signal if and when sent.

If upon restoration of the main line circuit to an operable condition, 25 or more spacing signals (of a time duration of five seconds or less) are transmitted over the main line by the out office prior to transmitting a 7-second timed open signal, the switching equipment will recycle and cancel out the false open signals caused by the wire failure without any interference to circuits associated with the switching equipment. For each of the 25 spacing signals (of a time duration less than five seconds) relay NSP will operate when the monitor relay MR goes to the spacing contact. Upon completion of the spacing signal the monitor relay MR moves to the marking contact and this allows relay NSP to remain operated through the winding of relay NSR. This operates relay NSR, which in turn energizes the rotary switch step magnet. Operation of the rotary step magnet on its contact 1 opens the circuit that holds relays NSP and NSR operated, which causes these relays to release and in turn deenergize the rotary switch step magnet, allowing it to advance from the 25th to the first point. When the rotary switch is stepped to the first point, relay NOH is operated through the wiper of the $k$ level to ground on point 1. Thus the rotary switch advances one step for each of the following 25 spacing signals until the rotary switch steps to the 25th point. Upon reaching this point, relays NIR, NSC and NOH are released by the absence of ground on the 25th point of the $k$ level on the rotary switch. The switching equipment has now been recycled and is back to the normal idle condition.

*Correction for signal bias and spark protection*

If not corrected, an inverse neutral multiple circuit of the kind disclosed herein would introduce signal bias by each repeater as well as certain undesirable transmission characteristics. For example, when equal marking and spacing make-break signals, such as 22.8 millisecond teleprinter impulses are sent into the sending leg of any network repeater, the travel time of the sending relay SR, i. e., the time required for the tongue of the relay to move from the marking to the spacing contact and from the spacing back to the marking contact, is added to the marking signal by the arrangement of the multiple circuit. Unless corrected, this would produce a marking bias in the output of the transmitting and receiving relays TR and RR. Also, the magnitude of the inductive current flow which must be keyed by the contacts of a main line or sending relay MLR or SR when transmitting to the multiple circuit 24 will vary with the number of repeaters which are interconnected. For example, when a network repeater is operating to its respective line circuit and is not connected to a second network repeater, the current load of the multiple circuit which the sending relay SR must key is that of only the windings 1 and 2 of its associated transmitting and receiving relays, or approximately 56 milliamperes. However, when a plurality of network repeaters are interconnected, the contacts of any sending relay SR must key the combined current load of the transmitting and receiving relays of all the interconnected repeaters. For example, if three network repeaters are interconnected, the current load to be keyed would be approximately 168 milliamperes. Therefore, spark protection proportionate to the variable current load should be provided for the contacts of all main line and sending relays and in a manner so as not to affect the character of the signals as received from the multiple circuit.

The means of overcoming both the travel time bias and for providing an adequate spark protection for the variable current load is accomplished by the use of a condenser 70, Figs. 2 and 3, of suitable size such as ¼ mfd., connected to the winding 3 of each transmitting and receiving relay TR and RR. A conducting strap 71 between the windings 2 and 3 of each of these relays causes each relay winding 3 and condenser 70 to be utilized as a combination wave shaper and spark killer. When the tongue of any sender SR leaves its spacing contact and removes ground from the multiple circuit 24, the ¼ mfg. condenser 70 associated with each receiver proceeds to charge through the relay windings 1, 2 and 3 connected in series aiding, the effect of which is to tail out all spacing signals received from the multiple circuit. In addition to the wave shaping effect, this charging circuit of the condenser functions as a spark killer by absorbing the inductive energy stored in the windings 1 and 2 when the sender removes ground from the multiple circuit.

By means of the strap 71 which is permanently connected to the windings 2 and 3 on the relay, the spark killer is individually associated with each receiver and is, therefore, effective only when the inductive current load of the associated relay is connected to the multiple circuit. This arrangement avoids a change in spark killer constants when the receiving relay is not required in certain repeaters and also causes no transmission change on the multiple circuit when additional repeaters are interconnected or removed from a working repeater circuit. In the embodiment illustrated in Figs. 2 and 3, the winding 3 of the transmitting and receiving relays has approximately 700 turns.

The biasing winding 4 of each relay also has 700 turns, and the negative biasing battery B15, Figs. 2 and 3, is applied through a resistance 140 of approximately 6000 ohms. The windings 1 and 2 together form an operate winding having 2800 turns which is four times the number of turns in the biasing winding 4.

The wave shaping effect of the condenser circuit is such that when any sender transmits straight-up signals, i. e., equal dwell on the marking and spacing contacts, to the multiple circuit, approximately 55 ma. bias will be required in the transmitting and receiving relays in order to obtain straight-up signals from their contacts. By keeping the spacing current low, for example, 28 ma., and using a greater number of turns (2800) in the operate windings of the transmitting and receiving relays, the current exerts a force twice as great as that of the biasing current, and the number of repeaters which may be interconnected at any one time is greatly increased.

*Talk switch circuit*

Each network repeater preferably is equipped with the two-position lever type talk switch 51, Fig. 2, for line-up and test purposes over the main line portion of the repeater circuit. Where a local drop circuit is not required, the repeater will not be equipped with sending and receiving relays for leg circuit operation. Therefore, the windings of the transmitting relay TR and the contacts of the main line relay MLR must be rearranged for the insertion of testing and regulating equipment for talk purposes over the main line. The talk switch performs this circuit change and arranges the repeater so that the line circuit can be regulated without interfering with the operation of the associated network subsets to other interconnected repeaters over the multiple circuit 24. For example, at an intermediate office, such as office E of Fig. 1, the line circuit to the switching office may be regulated without interfering with the use of the network sub-set over the line circuit to out office F.

The normal connections to the windings of the transmitting relay are arranged for the inverse neutral multiple circuit, and therefore to key this relay with straight-up signals for testing purposes requires that these connections be reversed in order to have the opposite directional effect on this relay. The talk switch, when operated to the talk position which is in the direction of the arrow, makes this reversal and terminates the operate windings 1 and 2 of the transmitting relay and the contacts of the main line relay in two local talk jacks designated RT and ST in Fig. 3, in which the testing and regulating teleprinter or Morse talk equipment may be inserted.

In the talk position of switch 51, the reversal of the transmitting relay windings connections provides a current of approximately 28 ma. from negative battery B, through the 4000 ohm resistor 53 and windings 1 and 2 of the relay in series aiding and to ground at the sending talk jack ST, Fig. 3, in a direction to operate the relay TR to its marking contact. This circuit, using four times as many relay winding turns, overrides the local bias current of approximately 55 ma. which flows from negative battery B15 and the 6000 ohm adjustable resistor 140, and winding 4 of the relay to ground in a direction tending to space the transmitting relay. By means of make-break signals from a teleprinter keyboard or Morse key when inserted in the sending talk jack ST, the transmitting relay will respond and transmit these signals over the main line circuit.

Signals received from the main line circuit will operate the main line relay MLR in the normal manner and the talk switch 51 arranges the contacts of this relay so that these signals will be received on either a teleprinter or Morse sounder inserted in the receiving talk jack RT. The circuit for receiving these signals includes negative battery B16, Fig. 3, a 1500 ohm resistor 141 through the jack RT, and contacts 9 of talk switch 51 to the marking contact and ground on the tongue of the main line relay MLR, providing a local 70 ma. circuit for operation of either a teleprinter magnet or a Morse sounder.

*Network dispatcher turret*

Associated with the network repeater and the control equipment at the switching office *d* is the network dispatcher turret 46, Figs. 1 and 3, which provides the facilities for monitoring, as well as for manual control, of the complete switching system. The sending and receiving legs 16 and 16′ of all network repeaters are wired through jacks 32 and 33 in this turret and may then be extended to network sub-sets located throughout the telegraph office for talk purposes. By means of a monitor set 35 and twin plug 34, Fig. 1, the dispatcher may plug into the leg circuit of any network repeater.

Also provided in the dispatcher turret are multiple and group jacks 41 which are the equivalent of the auxiliary switchboards used at certain out offices, such as switchboard 19 or 19′ in out offices E and F. These jacks enable the dispatcher to manually group and interconnect the multiple conductors of two or more repeaters together with patch cords.

A connection indicator circuit is also provided in the turret for each repeater and its associated control equipment. Such a circuit comprises a neon lamp 150, Fig. 3, and a three-position lever key 151 for each repeater at the switching office. By operating the lever key downwardly to the indicate position "IND," the dispatcher can determine by those neon lamps 150 which light, which repeaters are interconnected by the rotary switches. When the lever key 151 is operated upwardly to the disconnect position "DIS," a disconnect is made between any two repeaters which are interconnected by a rotary switch. The indicator circuit operates as follows: Indicator lamp 150 has a source of negative potential applied to one terminal of the lamp, the other terminal being connected through spring 152 and its associated break contact to a second source of negative potential of the same value, so that when the lever key 151 is in its normal position, as shown in Fig. 3, the lamp 150 does not light since there is a source of equal potential on opposite sides of the lamp. When the lever key 151 is thrown downwardly to the indicate position, this applies ground through the make contact of the key and spring member 152 to the lamp 150 and causes it to light. Also, the ground is applied to a circuit comprising indicating conductor 154, break contact and armature 5 of unoperated relay NSC, Fig. 4, conductor 155, and armature 6 of relay NOH, Fig. 5.

If the repeater whose indicating lever key 151 has been operated by the dispatcher is the one which made the connection with the other repeater, its associated relay NOH will be operated, and also its switch wiper arms will have been stepped around to a contact representing the selection code of the called repeater. Each repeater has the contact of the *a* level of its associated selection switch strapped to its indicating conductor 154, as by means of the strap 156 seen in Fig. 5. Assume that the repeater shown, and which is strapped to point 2 on level *a* of the switch, had called the repeater whose selection code is represented by point 24. This means that the wiper arms at switch S will be resting on point 24 on the two levels *a* and *b* of the switch. The indicating circuit, therefore, will extend from the armature 6 and make contact of the energized relay NOH of the calling repeater No. 2, and thence through wiper arm of level *a* of switch S to point 24 of the switch, thence through the multiple 158 which, it will be understood, is strapped by a connection like 156 to the indicating conductor of that repeater No. 24. Therefore, the ground applied to the conductor 154 of repeater No. 2 will be extended to conductor 154 of the called repeater 24 and will cause its indicating lamp 150 to light when the lever key associated with repeater No. 2 has been operated to the indicate position. The dispatcher, therefore, knows that repeaters 2 and 24 are interconnected. Similarly, if the dispatcher had operated the indicating key 154 associated with repeater 24, both lights 150 of repeaters 2 and 24 would have been lit. In like manner, any number of repeaters which may be interconnected at the time will be made known to the dispatcher by reason of the fact that each of their associated lamps 150 will light whenever the dispatcher throws the indicating key 151 associated with any of the repeaters.

When the lever key 151 associated with any repeater which has made a selection is operated to the disconnect position, that is, thrown upwardly as seen in Fig. 3, this will cause a disconnect to be made between any two repeaters which are interconnected by a rotary switch. The disconnect circuit is a follows: Ground on the make contact and spring 153 of the lever key 151 is applied to the disconnect conductor 160, and causes relay NTO, Fig. 4, to operate; the operation of this relay disconnects the repeater in the same manner as when the third timed open signal was received as hereinbefore described, and causes the return of the switch S to its home position which also causes the relay NOH to release. If the lever key is again operated to the indicate position, only the indicating lamp associated with that lever key will light because the connection as previously described for the indicating circuit for the other repeater is now open due to the release of the relay NOH and the restoration to the home position of the rotary switch S. If, however, the connection between repeaters 2 and 24 had been made by repeater No. 24, instead of by repeater No. 2, the operation of the lever key of repeater No. 2 to the disconnect position would not have performed the disconnect between these two repeaters, and when the lever key was again operated to the indicate position the two indicating lamps of the repeaters 2 and 24 would again light, indicating that the selection had not been made by repeater No. 2 but instead by repeater No. 24. This indicates to the dispatcher that repeater 24 made the selection, and he accordingly will actuate the lever key of repeater No. 24 to the disconnect position which in turn will cause a disconnect between these two repeaters to be made by operating relay NTO associated with repeater No. 24 as previously described.

This indicating circuit operates in a similar manner when more than two repeaters are interconnected by reason of two or more repeaters having selected a third repeater. For example, assume that repeaters 2 and 5 had successively selected repeater 24; then operating the lever keys of either repeater 2, 5 or 24 to its indicate position would cause the three respective indicating lamps to light. If the dispatcher desires to disconnect this set-up, he may do so and at the same time determine which two of the three repeaters had made a selection to the third or selected repeater as follows: Operating the lever key of repeater 24 to the disconnect position and then back to the indicate position would not cause a disconnect operation between any two of these three repeaters, and the three indicating lamps would again light. However, operating the lever key of repeater No. 2 to the disconnect position would cause the rotary switch associated with repeater No. 2 to return to the home position and consequently open its individual indicating circuit. Operating the lever key of repeater No. 2 again to the indicate position will cause only its individual lamp to light, thus indicating to the dispatcher that repeater No. 2 is no longer associated through the rotary switch with repeaters 5 and 24. Now, operating the lever key of repeater No. 5 to the disconnect position will cause the rotary switch of repeater No. 5 to return to the home position and therefore open its respective indicating circuit and when the dispatcher reoperates this lever key of repeater No. 5 to the indicate position, only the lamp associated with repeater No. 5 will light, thus indicating to the dispatcher that repeater No. 5 was the second of two repeaters to have initiated a connection to repeater No. 24.

Point 1 of each rotary switch, corresponding to a selection code of one spacing pulse, is wired to a common signal relay 162, Fig. 3, located in the dispatcher turret. Point 1 of the rotary switch is embodied in the *a* level of the rotary switch, although it is shown in Fig. 1 along with points 2 to 25 which are embodied in level *b* of the switch as seen in Fig. 5. Each out office, when the need arises, may summon the dispatcher by using the selection procedure and one spacing pulse, which in turn operates an audible alarm 163 and a lamp 164, both of which are common to all of the repeaters, and also operates the neon lamp 150 associated with the calling repeater. The circuit for operating the signal relay 162 may be traced from ground on the winding of the relay through conductor 39, point 1 of the *a* level of the switch S of the calling repeater, make contact and armature 6 of operated relay NOH, conductor 155, armature and break contact 5 of unoperated relay NSC, conductor 154, and spring 152 and break contact of the lever key 151, to negative battery, thus operating relay 162, the relay remaining operated so long as the wiper of the calling repeater is on point 1 of the *a* level of the switch. The circuit just described causes neon lamp 150 of the calling repeater to light and thus indicates to the dispatcher which repeater is calling. The operation of relay 162 causes the audible alarm 163 to sound the lamp 164 to burn. The dispatcher upon answering this particular repeater circuit will operate its associated lever key to the disconnect position which in turn operates relay NTO and causes the associated rotary switch S to return to its home position. The return of the rotary switch to the home position opens the circuit and releases signal relay 162 which in turn extinguishes the neon lamp 150 and disables the audible signal 163 and the lamp 164. It will be noted that point 1 of level *b* of switch S has no multiple connected thereto, since the dispatcher is called in by the circuit which involves point 1 of level *a*.

In Fig. 3 the sending leg 16 from the network subsets 17 extends through the sending leg jack 32 of the dispatcher turret, and thence to the cut switch 92; it will be understood that at the out stations, however, leg 16 extends from the subsets directly to the cut switch 92 of the repeater.

Two jacks 90 and 165 are provided on the repeater for the purpose of testing and regulating the main line circuits from the repeater leg. By means of a portable teleprinter keyboard plugged into the sending jack 90 and a teleprinter magnet plugged into the receiving jack 165, the testing and regulating attendant may send and receive signals over the main line circuit of the repeater for testing purposes. Associated with these two jacks is the cut switch 92 which is used to terminate the sending leg in ground at the repeater independently of any associated network sub-sets which may be wired to the repeater. Operating this switch to the downward position allows the sending leg to be terminated for test purposes without local interference by any sub-set, and also causes signal lamps 175 on the repeater and in the dispatcher turret to light which serve as a warning to the attendant as well as the dispatcher that the repeater is being regulated and that this switch is in its downward position. In addition to the cut switch, the operation of the talk switch 51 of Fig. 2 to the talk position will also cause the lamps 175 to light to indicate a similar test condition existing on the repeater.

Associated with the switching equipment for each repeater at the switching office is the close-out key 67 of Fig. 4 which is provided for the purpose of disassociating the switching equipment from its associated repeater in case of faulty operation of the switching equipment. When this close-out key is operated to the close-out position, that is, in the direction of the arrow, the main line repeater circuit is shunted around the associated switching equipment and the monitor relay MR, and any portion of the switch equipment may now be removed or tested without causing interference to the main line repeater circuit. Also provided for testing purposes on the switching equipment is a test key 177 which may be used to simulate incoming signals the same as would normally be received and indicated by the monitor relay contacts M and S. When the close-out key 67 is operated to the close-out position, the operate circuit for the tube 115 and associated relay NTO is transferred from the marking and spacing contact of the monitor relay MR to a break and a make contact on the test button 177. Ground on the tongue of this test button when in the position shown represents an incoming marking signal, and when this key is depressed to the lower contact a spacing signal is supplied to the switching equipment. Therefore, by manually operating the test key 177, timed open signals and also selection code pulses similar to those normally received from the main line repeater circuit, may be supplied to the repeater switching circuits for testing and regulating purposes.

*System adapted for carrier, duplex or two-wire directional operation*

*Carrier.*—In position 1 of the line switch 50, Fig. 2, the system is arranged for carrier operation. Preferably, although not necessarily, the carrier system is of the type shown in the Boughtwood and Michon Patent No. 2,573,392, issued October 30, 1951. Negative battery is furnished by the carrier over its receiving and sending legs, terminating in ground at the network repeater. Make-break signals from the carrier receiving leg enter the repeater through the Line In jack 54 of Fig. 3 and pass over conductor L, through jack 55, winding 1 of the main line relay MLR, conductor 56, windings 1 and 4 in parallel of monitor relay MR, Fig. 4, conductor 57, right hand winding of the line meter MA, Fig. 2, conductor 62 and arm of unit 7 of line switch 50, to ground. Preferably, this is a 70 milliampere circuit and when closed at the carrier operates the main line and monitor relays of the repeater to their making contacts, overriding a local bias current of approximately one-half this value connected to the winding 2 of MLR and windings 2 and 3 of MR in a direction to space the relays. The main line and monitor relays will, therefore, respond to make-break signals received from the output tube of the carrier.

For transmission of signals from the repeater into the carrier, negative battery on the carrier sending leg, adjusted to 70 milliamperes, enters the repeater through the Line Out jack 144 of Fig. 3 and over a circuit comprising jack 145, conductors 170 and 171, Figs. 3 and 2, switch arm of unit 9 of line switch 50, conductor 61, armature 1 and break contact of relay NIR, Fig. 4, conductor 65, break contacts 2 of close-out key 67, conductor 68, tongue and marking contact of transmitting relay TR, Fig. 2, conductor 69, and grounded switch arm of unit 3 of line switch 50. The transmitting relay of the repeater will respond to signals received over the multiple conductor 24 and will be operated to the marking contact for an open signal. The operation of this relay opens and closes the sending leg of the carrier, which causes a voltage change of approximately 40 volts on the cathode of the keying rectifier tube of the carrier transceiver. This is sufficient to key the carrier and transmit frequency modulated signals.

*Duplex.*—The duplex operation of the system, with the line switch 50 in position 2, has hereinbefore been described in detail. Briefly, the transmitting relay TR responds to signals from the multiple conductor 24 and transmits polar signals over the main line on a duplex basis, to the distant duplex set. Similarly, polar signals transmitted by the sending relay of the distant set, over the main line on a duplex basis, will operate the main line relay MLR and monitor relay MR of the network repeater. A 1000 ohm adjustable apex resistor 60, Fig. 2, is provided in the repeater for the purpose of limiting the line current and at the same time keeping the effective differential current in the main line relay windings as high as possible under this condition.

Under adverse conditions, the repeater may be operated duplex with earth current neutralization. This arrangement permits the use of a second line conductor, adjacent to and with similar electrical characteristics as the conductor used for duplex operation, to be connected to the repeater and distant duplex set in a manner which will neutralize and cancel out in the windings of the main line relays, the harmful effects of power induction or a difference in earth potential between two main line sections. Such a neutralizing conductor will enter the repeater through the Line Out jack 144 of Fig. 3 and follows a series path, through jack 145, conductor 170, switch unit 5 of line switch 50, conductor 172 and windings 3 and 4 of main line relay MLR, Fig. 3, to ground. These two windings, which together are equal in turns to that of the winding 1 used for the duplex line circuit, are connected to the neutralizing conductor in a manner to oppose the line winding 1. Therefore, extraneous interferences equally affecting both line wires will tend to magnetically cancel out, allowing the main line relay to respond only to signals transmitted by the distant set.

As hereinbefore set forth, for duplex operation the line meter MA is inserted in the apex of the duplex circuit and functions in the usual differential manner for observing the duplex balance. Also provided for balancing and test purposes are the jacks 55 and 145, and jacks designated BR and LK, Fig. 3. The line-in jack 55 permits a milliammeter to be inserted in series with the line conductor for regulating the duplex line current. The line-out jack 145 provides the means of observing earth currents with a milliammeter in the line conductor used for earth current neutralization. The bridge jack BR is for the purpose of inserting a capacity balance indicator across the bridge of the duplex circuit. The leak jack LK is for observing with a milliammeter the signals which are sent to the duplex line by the transmitting relay TR.

*Two-wire directional.*—Two-wire directional operation requires two main line conductors over which polar signals are transmitted and received. When the line switch 50 is in position 3, the receiving line, or the distant terminal's sending conductor, is connected to the line-jack 54 or 55 of the network repeater, through winding 1 of the main line relay MLR, and over a circuit comprising conductor 56, windings 1 and 4 of monitor relay MR, Fig. 4, conductor 57, right hand winding of the line meter MA, Fig. 2, conductor 62, and switch arm of unit 7 of line switch 50 to ground. Negative battery from the distant terminal operates the tongue of the main line relay to the marking contact and positive battery moves the tongue to the spacing contact. For transmission of signals from the repeater to the distant set, the transmitting relay TR responds to signals from the multiple conductor 24 and sends polar signals through the line-out jack 145 and 144 to the distant set, which signals operate the polar receiving relay at the distant set.

Various modificatons of the apparatus and circuit arrangements shown, and various equivalents or substitutes for the devices depicted, readily will occur to those versed in the art without departing from the spirit or scope of the present invention. The disclosure, therefore, is for the purpose of illustrating the principles of the invention which is not to be regarded as limited except as indicated by the scope of the appended claims.

What is claimed is:

1. A telegraph repeater switching system comprising a plurality of stations each of which includes a send-receive telegraph instrument and a repeater, a switching office having a plurality of repeaters respectively connected to the repeaters at said stations, a plurality of stepping switches respectively connected to the repeaters at the switching office and each having a wiper arm and a bank of contacts respectively individual to said stations and each responsive to selection stepping pulses transmitted by a calling station for selectively stepping the switch wiper to a contact which represents a called station, the corresponding contacts of said banks of the switches being connected in multiple, and each of said repeaters at the switching office having a multiple connection extending therefrom to the wiper arm of its associated stepping switch and also to that conductor of said multiple which extends to the bank contacts that are individual to that particular repeater and its associated station, whereby two or more repeaters in the switching station may be connected together in multiple to provide a network of the calling and called stations in response to the selection stepping pulses transmitted by the calling station.

2. A system according to claim 1, in which each of said stations has means for generating an "initiate" signal preparatory to the transmission of said selection stepping pulses for effecting selection of a called station and for generating a "selection completed" signal following the transmission of the selection pulses, means at the switching office responsive to said "initiate" signal for conditioning the switching apparatus to recognize the succeeding stepping pulses as selection pulses and for transmitting a signal to the calling station to indicate there that the selection pulses may be transmitted, means at the switching office responsive to the "selection completed" signal for connecting through the multiple of the repeater of the calling station to the multiple of the repeater of the called station, and means operative upon the completion of said connection for transmitting a signal back to the calling station to indicate that the connection has been made.

3. A system according to claim 1, in which each of said stations has means for generating an "initiate" signal preparatory to the transmission of said selection stepping pulses for effecting selection of a called station, a "selection completed" signal following the transmission of the selection pulses and a "disconnect" signal, means at the switching office responsive to said "initiate" signal for conditioning the switching apparatus to recognize the succeeding stepping pulses as selection pulses and for transmitting a signal to the calling station to indicate there that the selection pulses may be transmitted, means at the switching office responsive to the "selection completed" signal for connecting through the multiple of the repeater of the calling station to the multiple of the repeater of the called station, means operative upon the completion of said connection for transmitting a signal back to the calling station to indicate that the connection has been made, and means at the switching office responsive to said "disconnect" signal for disconnecting the multiples of the connected repeaters and for causing the stepping switch of the calling station to return to its home position.

4. An inverse neutral telegraph repeater switching system comprising a plurality of stations each of which includes a send-receive telegraph instrument and an inverse repeater, a switching office having a plurality of inverse repeaters respectively connected to the repeaters at said stations, a plurality of stepping switches respectively connected to the repeaters at the switching office and each having a wiper arm and a bank of contacts respectively individual to said stations and each responsive to a series of signal spacing pulses either of uniform or non-uniform length transmitted by the telegraph instrument of a calling station for selectively stepping the switch wiper to a contact which represents a called station, the corresponding contacts of said banks of the switches being connected in multiple, and each of said repeaters at the switching office having a multiple connection extending therefrom to the wiper arm of its associated stepping switch and also to that conductor of said multiple which extends to the bank contacts that are individual to that particular repeater and its associated station, whereby two or more repeaters in the switching station may be connected together in multiple to provide an inverse neutral network of the calling and called stations in response to the selection spacing pulses transmitted by the calling station.

5. A system according to claim 4, in which each of said stations has means for generating a timed open "initiate" signal of predetermined duration preparatory to the transmission of said series of signal spacing pulses for effecting selection of a called station and for generating a timed open "selection completed" signal of predetermined duration following the transmission of the selection spacing pulses, means at the switching office responsive to said timed open "initiate" signal for conditioning the switching apparatus to recognize the suceeding series of signal spacing pulses as selection pulses and for transmitting a signal to the calling station to indicate there that the selection pulses may be transmitted, means at the switching office responsive to the timed open "selection completed" signal for connecting through the multiple of the repeater of the calling station to the multiple of the repeater of the called station, and means operative upon the completion of said connection for transmitting a signal back to the calling station to indicate that the connection has been made.

6. A system according to claim 4, in which each of said stations has means for generating a timed open "initiate" signal of predetermined duration preparatory to the transmission of said series of signal spacing pulses for effecting selection of a called station and for generating a timed open "selection completed" signal of predetermined duration following the transmission of the selection spacing pulses and a timed open "disconnect" signal of predetermined duration, means at the switching office responsive to said timed open "initiate" signal for conditioning the switching apparatus to recognize the succeeding series of signal spacing pulses as selection pulses and for transmitting a signal to the calling station to indicate there that the selection pulses may be transmitted, means at the switching office responsive to the timed open "selection completed" signal for connecting through the multiple of the repeater of the calling station to the multiple of the repeater of the called station, means operative upon the completion of said connection for transmitting a signal back to the calling station to indicate that the connection has been made, and means at the switching office responsive to said timed open "disconnect" signal for disconnecting the multiple of the connected repeaters and for causing the stepping switch of the calling station to return to its home position.

7. A system according to claim 4, in which each of said stations has means including a timing circuit for generating an "initiate" signal of predetermined duration preparatory to the transmission of said series of signal spacing pulses for effecting selection of a called station and for generating a "selection completed" signal of predetermined duration following the transmission of the selection spacing pulses, means at the switching office responsive to said "initiate" signal for conditioning the switching apparatus to recognize the succeeding series of spacing pulses as selection pulses and means including a timing circuit for generating and transmitting a signal of predetermined duration to the calling station to indicate there that the selection pulses may be transmitted, means at the switching office responsive to the "selection completed" signal for connecting through the multiple of the repeater of the calling station to the multiple of the repeater of the called station, means operative upon the completion of said connection for transmitting a signal back to the calling station to indicate that the connection has been made, said timing circuits each including a gaseous discharge tube having a starting electrode and a storage condenser and resistance in circuit therewith for controlling the potential rise on said starting electrode and hence the timing of the circuit, and means including a relay for initiating the operation of each timing circuit.

8. A system according to claim 6, with means for generating said timed open signals each of a duration at least several times longer than that of any of said signal spacing pulses transmitted.

9. A telegraph repeater switching system comprising a plurality of out stations each of which includes a send-receive telegraph instrument and a repeater, a switching office having a plurality of repeaters respectively connected by transmission circuits to the repeaters at said out stations, a plurality of stepping switches respectively connected to the repeaters at the switching office and each having a wiper arm and a bank of contacts respectively individual to said stations and each responsive to selection stepping pulses transmitted by a calling station for selectively stepping the switch wiper to a contact which represents a called station, the corresponding contacts of said banks of the switches being connected in multiple, and each of said repeaters at the switching office having a multiple connection extending therefrom to the wiper arm of its associated stepping switch and also to that conductor of said multiple which extends to the bank contacts that are individual to that particular repeater and its associated station, whereby two or more repeaters in the switching station may be connected together in multiple to provide a network of the calling and called stations in response to the selection stepping pulses transmitted by the calling station, an attendant's equipment at the switching office including manually operable switch members and signal devices individual to said repeaters in such office, and circuits controlled by said stepping switches and said switch members for energizing certain of said signal devices to indicate which of said repeaters currently are connected together.

10. A system according to claim 9, including circuits controlled by said manually operable switch members for selectively disconnecting the repeater of any of said calling stations from the multiple.

11. A system according to claim 9, in which the attendant's equipment includes a send-receive telegraph instrument and a signal device common to the repeaters, means controlled by said stepping switches for energizing said common signal device to enable any calling station to signal the attendant, means for energizing the signal device individual to the repeater of the calling station to indicate to the attendant which station is calling, and means for operatively connecting the telegraph instrument in the attendant's equipment with the repeater of the calling station.

12. A system according to claim 9, in which each of said stepping switches has associated therewith a monitor relay responsive to signals received from a calling station, an auxiliary circuit responsive to said relay for controlling the operation of its associated stepping switch, and switch means operable at will for disconnecting the auxiliary circuit from its associated stepping switch for testing or other purpose without disturbing an existing connection between two or more stations involving its said associated stepping switch.

13. A system according to claim 9, in which the equipment at the switching office includes a line switch manually operable to at least three positions and circuits respectively controlled thereby for changing the repeater connections to arrange the transmission circuit between an out station and the switching office either for carrier, duplex or two-wire directional operation according to the position of said line switch.

14. An inverse neutral telegraph switching system comprising a plurality of stations each of which includes a send-receive telegraph instrument and an inverse repeater, a switching office having a plurality of inverse repeaters respectively connected to the repeaters at said stations, switching equipment for selectively connecting two or more repeaters together in a multiple circuit at the switching office thereby to provide an inverse neutral network of a plurality of said stations, each of said repeaters including main line and sending relays having contacts for sending marking and spacing signals to the multiple circuit and having transmitting and receiving relays for receiving said signals from the multiple circuit, each of said transmitting and receiving relays having a biasing winding for normally biasing the relay armature to its marking contact and having an operate winding for actuating the relay armature to its spacing contact in response to said spacing signals, said operate winding having more than twice the number of turns of said biasing winding to reduce substantially the signal current which the contacts of the main line and sending relays have to make and break for each repeater at the time connected to the multiple circuit and thus increase the possible number of repeaters which may be connected in multiple at any one time.

15. An inverse neutral telegraph switching system comprising a plurality of stations each of which includes a send-receive telegraph instrument and an inverse repeater, a switching office having a plurality of inverse repeaters respectively connected to the repeaters at said stations, switching equipment for selectively connecting two or more repeaters together in a multiple circuit at the switching office thereby to provide an inverse neutral network of a plurality of said stations, each of said repeaters including main line and sending relays having contacts for sending marking and spacing signals to the multiple circuit and having transmitting and receiving relays for receiving said signals from the multiple circuit, each of said transmitting and receiving relays having a biasing winding for normally biasing the relay armature to its marking contact and having an operate winding for actuating the relay armature to its spacing contact in response to said spacing signals, said operate winding having approximately four times as many turns as said biasing winding to reduce the signal current which the contacts of the main line and sending relays have to make and break for each repeater at the time connected to the multiple circuit and thus increase the possible number of repeaters which may be connected in multiple at any one time.

16. An inverse neutral telegraph switching system comprising a plurality of stations each of which includes a send-receive telegraph instrument and an inverse repeater, a switching office having a plurality of inverse repeaters respectively connected to the repeaters at said stations, switching equipment for selectively connecting two or more repeaters together in a multiple circuit at the switching office thereby to provide an inverse neutral network of a plurality of said stations, each of said repeaters including main line and sending relays having contacts for sending marking and spacing signals to the multiple circuit and having transmitting and receiving relays for receiving said signals from the multiple circuit, each of said transmitting and receiving relays having a biasing winding for normally biasing the relay armature to its marking contact and having an operate winding for actuating the relay armature to its spacing contact in response to said spacing signals, and a signal shaping circuit for overcoming marking bias present in the signals received by said transmitting and receiving relays comprising an auxiliary winding on each of said last named relays and connected at one end in series aiding with the operate winding, and a grounded condenser connected to the other end of said auxiliary winding, said auxiliary winding and said condenser operating to tail out the spacing signals received from the multiple circuit to an extent sufficient to overcome said marking bias.

17. A system according to claim 16, in which said condenser has a value sufficient to absorb the inductive energy stored in the operate winding of each transmitting relay and receiving relay and operative as a spark killer circuit when the armature of the sending relay leaves its spacing contact.

18. A system according to claim 17, in which each spark killer circuit is individually wired to the transmitting relay and receiving relay of each repeater, whereby the amount of spark protection automatically will vary with the number of inductive transmitting and receiving relays connected at any one time of the multiple circuit.

PHILIP R. EASTERLIN.

REFERENCES CITED

The following references are of record in the file of this patent:

UNITED STATES PATENTS

| Number | Name | Date |
|---|---|---|
| 2,280,292 | Kinkead et al. | Apr. 21, 1942 |
| 2,546,630 | Currie et al. | Mar. 27, 1951 |
| 2,560,266 | Bacon et al. | July 10, 1951 |
| 2,584,736 | Perry | Feb. 5, 1952 |
| 2,599,344 | Oberman | June 3, 1952 |
| 2,599,988 | Halvorsen | June 10, 1952 |